(12) United States Patent
Wandtke et al.

(10) Patent No.: US 9,296,344 B2
(45) Date of Patent: Mar. 29, 2016

(54) SHAPED ARTICLE WITH DECORATIVE PART

(75) Inventors: Sebastian Wandtke, Heidelberg (DE); René Zemmrich, Betzdorf (DE)

(73) Assignees: Faurecia Innenraum Systeme GMBH, Hagenbach (DE); Faurecia Interieur Industrie, Meru Cedex (FR)

( * ) Notice: Subject to any disclaimer, the term of this patent is extended or adjusted under 35 U.S.C. 154(b) by 1008 days.

(21) Appl. No.: 13/457,056

(22) Filed: Apr. 26, 2012

(65) Prior Publication Data

US 2012/0276338 A1 Nov. 1, 2012

(30) Foreign Application Priority Data

Apr. 26, 2011 (DE) .......................... 10 2011 018 559

(51) Int. Cl.
| | |
|---|---|
| *B32B 3/02* | (2006.01) |
| *B60R 13/02* | (2006.01) |
| *B60R 13/00* | (2006.01) |
| *B29L 31/30* | (2006.01) |
| *B29C 45/14* | (2006.01) |

(52) U.S. Cl.
CPC ........... *B60R 13/02* (2013.01); *B29C 45/14811* (2013.01); *B29C 45/1418* (2013.01); *B29C 45/14786* (2013.01); *B29C 2045/14139* (2013.01); *B29L 2031/3041* (2013.01); *B60R 13/005* (2013.01); *B60R 13/0206* (2013.01); *B60R 13/0243* (2013.01); *Y10T 428/24322* (2015.01); *Y10T 428/24488* (2015.01); *Y10T 428/24777* (2015.01)

(58) Field of Classification Search
CPC ............... Y10T 428/24488; Y10T 428/24322; Y10T 428/24777; B60R 13/02; B60R 13/005; B60R 13/0243; B60R 13/0206; B29L 2031/3041; B29C 45/1481; B29C 2045/14139
See application file for complete search history.

(56) References Cited

U.S. PATENT DOCUMENTS 6,991,841 B2 * 1/2006 Cowelchuk et al. ............ 428/71

FOREIGN PATENT DOCUMENTS

| | | |
|---|---|---|
| DE | 202004011482 U1 | 11/2004 |
| DE | 202004011483 U1 | 11/2004 |
| DE | 102005039948 A1 * | 3/2007 |
| JP | 63212509 A | 9/1988 |

OTHER PUBLICATIONS

Machine translation of applicant cited reference DE 202004011482U1.*
Machine translation of cited reference DE102005039948A1.*

* cited by examiner

*Primary Examiner* — Donald J Loney
(74) *Attorney, Agent, or Firm* — Ingrassia Fisher & Lorenz, P.C.

(57) ABSTRACT

Shaped articles are provided herein. In one example, the shaped article (10) comprising a carrier (20) and a flexible decorative part (30) of planar design with an edge (31) and an edge region (32), wherein the carrier (20) features a groove (22) for the edge region (32), the decorative part (30) comprises a visible layer (40) and a cushion layer (50), the decorative part (30) is arranged on the carrier (20) in such a way that the cushion layer (50) faces the carrier (20) and the edge region (32) engages into the groove (22), and wherein the decorative part (30) features one or more recesses (41) that are arranged in the edge region (32) and partially or completely extend across the depth of the visible layer (40).

10 Claims, 10 Drawing Sheets

SHAPED ARTICLE WITH DECORATIVE PART

CROSS-REFERENCE TO RELATED APPLICATION

This application claims priority to German Patent Application No. DE 10 2011 018 559.3, filed Apr. 26, 2011, which is incorporated herein by reference in its entirety.

TECHNICAL FIELD

The embodiments contained herein pertain to a shaped article that comprises a carrier and a flexible decorative part of planar design with an edge and an edge region, wherein the carrier features a groove for the edge region, wherein the decorative part comprises a visible layer and a cushion layer, and wherein the decorative part is arranged on the carrier in such a way that the cushion layer faces the carrier and the edge region engages into the groove.

The novel shaped article comprises an interior trim panel for the interior of vehicles. Shaped articles or interior trim panels for vehicles with a carrier and a decorative part are known from the prior art.

BACKGROUND

DE 202004011482 U discloses a module for the interior trim of automobiles that comprises at least one carrier layer and at least one decorative layer, wherein the carrier layer consists of a plastic carrier layer that is connected to the decorative layer by means of back-pressing. The plastic carrier player is manufactured of a glass fiber-reinforced thermoplastic or of a continuous fiber-reinforced thermoplastic. A carpet layer, a velour layer, a printed film, a TPO-film, a PVC-film or a layer of synthetic leather is used as decorative layer. A barrier layer consisting of one or more layers may be arranged between the plastic carrier layer and the decorative layer and comprise at least one thermoplastic layer and/or one nonwoven layer and/or one foamed layer.

DE 202004011483 U describes a partition wall module for automobiles consisting of a structural module that is provided with a decorative layer. The structural module comprises a plastic carrier layer that is connected to the decorative layer and, if applicable, an intermediate barrier layer by means of back-pressing. The plastic carrier layer is preferably manufactured of a glass fiber-reinforced or continuous fiber-reinforced thermoplastic. The carrier layer comprises, in particular, a material of polyamide compounds. Textile or textile-like materials are used for the decorative layer. The barrier layer preferably consists of a trilaminate of a thermoplastic, a polypropylene film and a nonwoven material.

JP 63212509 A describes an interior trim panel for automobiles that comprises a layer of a foamed thermoplastic polymer and a decorative layer. Pre-cut sections of the foamed polymer and the decorative layer are shaped and bonded to one another by means of a vacuum press.

In addition, other objects, desirable features and characteristics will become apparent from the subsequent summary and detailed description, and the appended claims, taken in conjunction with the accompanying drawings and this background

SUMMARY

Panel-like shaped articles with decorative parts inserted in an intarsia-like fashion are used for the interior trim of automobiles. The decorative parts have a textile surface with a cushion-like surface feel. Decorative parts with a two-layer or multi-layer structure proved advantageous for achieving the above-described properties. Suitable decorative parts comprise a visible textile layer and an elastic cushion layer. In order to manufacture shaped articles for the interior trim of automobiles, the decorative parts are non-positively connected to a carrier. The carrier is usually injection-moulded of a thermoplastic polymer. Various methods such as bonding or back-injection shaped article may be used in order to non-positively connect the decorative part to the carrier. In this case, the decorative part needs to be subjected to tension forces. The tension forces exerted upon the decorative part result in increased crease formation and more rejects in series production.

At least one embodiment accordingly is based on the objective of developing a shaped article of the above-described type, particularly an interior trim panel for vehicles, which can be manufactured with a low reject rate. This objective is attained with a shaped article that comprises a carrier and a flexible decorative part of planar design with an edge and an edge region, wherein the carrier features a groove for the edge region, wherein the decorative part comprises a visible layer and a cushion layer, wherein the decorative part is arranged on the carrier in such a way that the cushion layer faces the carrier and the edge region of the decorative part engages into the groove, and wherein the decorative part features one or more recesses that are arranged in the edge region and partially or completely extend across the depth of the visible layer.

Advantageous additional developments of the novel shaped article in accordance with various embodiments are characterized in that. The decorative part comprises an insulating layer that is arranged adjacent to the cushion layer and faces the carrier, wherein this insulating layer preferably consists of a nonwoven fabric of natural or synthetic fibers or mixtures thereof. The edge region of the decorative part is partially or entirely connected and/or a surface of the decorative part that faces away from the visible layer is partially or entirely connected to the carrier in a non-positive fashion. The visible layer consists of a single-layer or multi-layer textile material, particularly of a knitted fabric or woven fabric of natural or synthetic fibers or a mixture thereof. The cushion layer consists of an elastic material, particularly of a polymer foam or a nonwoven fabric of natural or synthetic fibers or a mixture thereof. The carrier consists of a material that comprises a polymer matrix, particularly polypropylene, and, if applicable, additives such as color pigments, softeners and fillers. The at least one recess is realized in the form of a slot or in the form of a rectangular cutout and a longitudinal axis of the recess preferably is aligned essentially parallel to the edge. The recess is closed similar to a ring. The decorative part comprises one or more lugs that are arranged on the edge, wherein the recesses are preferably arranged within and/or in front of the lugs. The edge region has a width of about 10 to about 30 mm, such as about 10 to about 25 mm, for example about 10 to about 20 mm. The recesses have a width of about 0.2 to about 5.0 mm, such as about 1.0 to about 3.0 mm, for example about 2.0 to about 3.0 mm. A central longitudinal axis of the recesses extends at a distance of about 0 to about 20 mm, such as about 2 to about 12 mm, for example about 2 to about 8 mm, from the edge of the decorative part.

At least one embodiment furthermore aims to make available a method for manufacturing moulded bodies of the above-described type that has a low reject rate. This objective is attained with a method that comprises the steps of furnishing a decorative part that comprises a visible layer and a cushion layer, as well as one or more recesses that are arranged in an edge region of the decorative part and partially or completely extend across the depth of the visible layer. An injection mould is furnished with two or more mould parts, wherein a first mould part features a recess for the edge region of the decorative part. The decorative part is arranged in the first mould part such that the cushion layer faces the first mould part and the edge region engages into the recess. The decorative part is fixed in the first mould part. The injection mould is closed and a viscous, curable material is injected into the injection mould.

Advantageous additional developments of the novel method are characterized in that the injection mould features one or more ribs and/or one or more holding devices for fixing the decorative part, wherein the holding device is preferably arranged in the first mould part and the ribs are arranged in the second mould part. The first mould part features at least one injection channel with an outlet opening that is arranged in the mould part such that the decorative part is essentially back-injected centrally. The decorative part comprises an insulating layer adjacent to the cushion layer and is arranged such that the insulating layer faces the first mould part. The edge region of the decorative part features one or more lugs and the first mould part is equipped with leadthroughs for the lugs.

In the novel method, the decorative part is preferably fixed in the first mould part such that tension forces acting upon the decorative part are decoupled from the visible layer by the at least one recess and essentially engage on the cushion layer.

BRIEF DESCRIPTION OF THE DRAWINGS

The embodiments are described in greater detail below with reference to schematic figures. In these drawings.

DETAILED DESCRIPTION OF THE DRAWINGS

Figure 1:
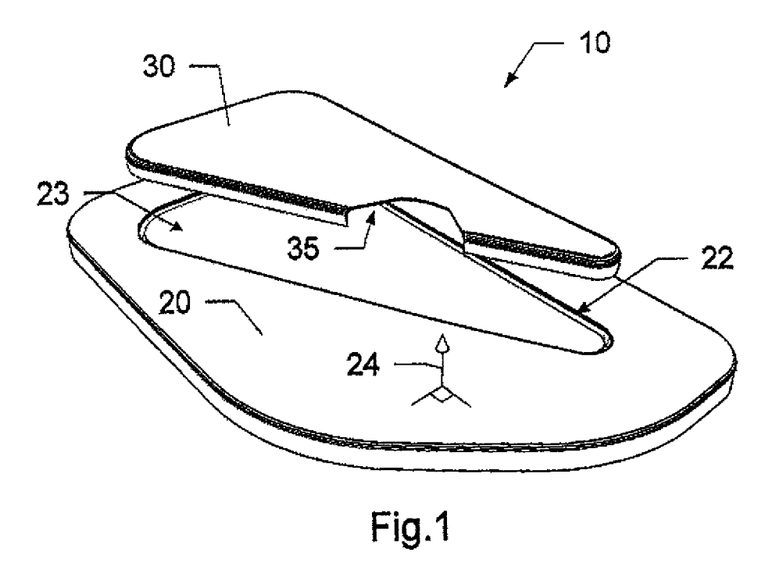
FIGS. 1 to 2 show perspective representations of a shaped article in the form of exploded views.
Figure 2:
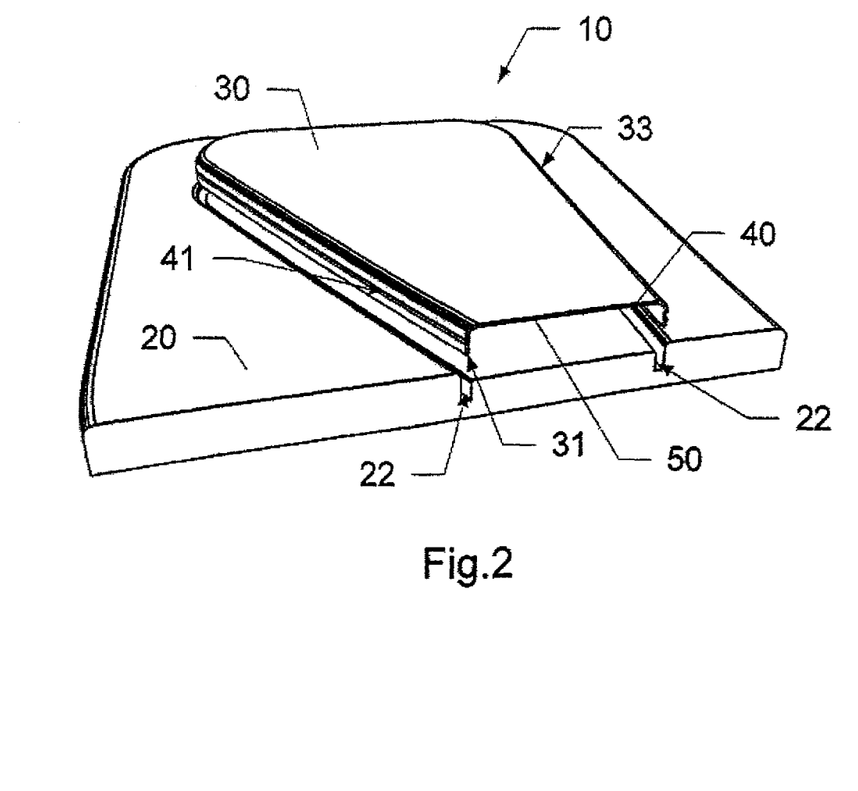

Referring to FIGS. 1 and 2, a novel shaped article 10 comprises a carrier 20 and a decorative part 30 in accordance with an embodiment. The carrier 20 has a planar design and a three-dimensional contour that is essentially flat or defined by the respective design and features convex and concave areas, as well as, if applicable, one or more openings and recesses for trim strips and control elements such as pushbuttons, switches and rotary knobs for window openers and exterior mirrors. The carrier 20 is advantageously provided with projections, depressions and bores for the installation in a car door on its edge and/or on the side that lies opposite of the decorative part 30. The projections, depressions and bores serve for producing a non-positive connection with the car door by means of holding elements such as corresponding fasteners, pins and screws.

The carrier 20 is manufactured of a material that, if applicable, contains additives in addition to a matrix. In one embodiment, thermoplastic polymers such as polypropylene or polyester are used as matrix. The additives are, for example, color pigments, softeners, fillers and/or reinforcing fibers. The fillers used may be nanoscale minerals such as bentonite. If applicable, short cut carbon or aramide fibers are used as an additive in order to reinforce the material.

Figure 3:
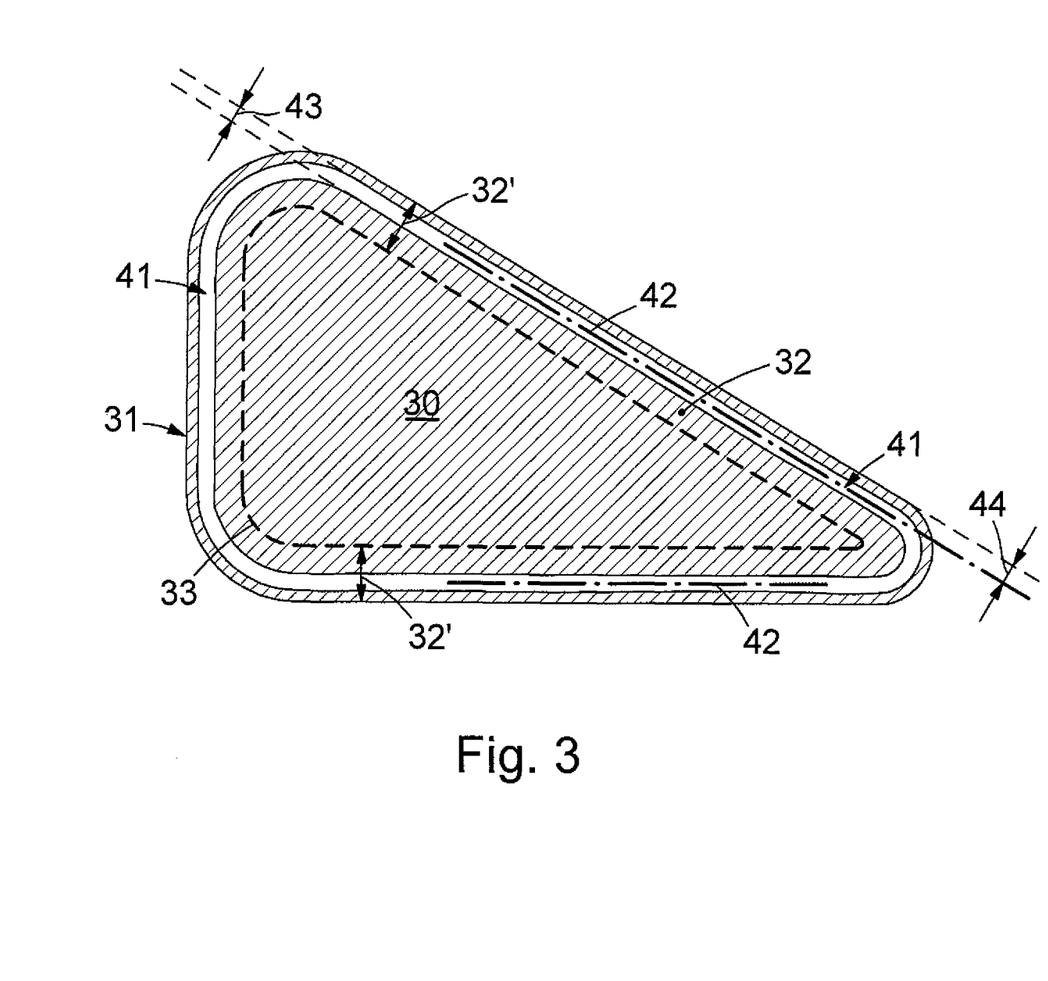
FIG. 3 shows a top view of a decorative part.
Figure 4:
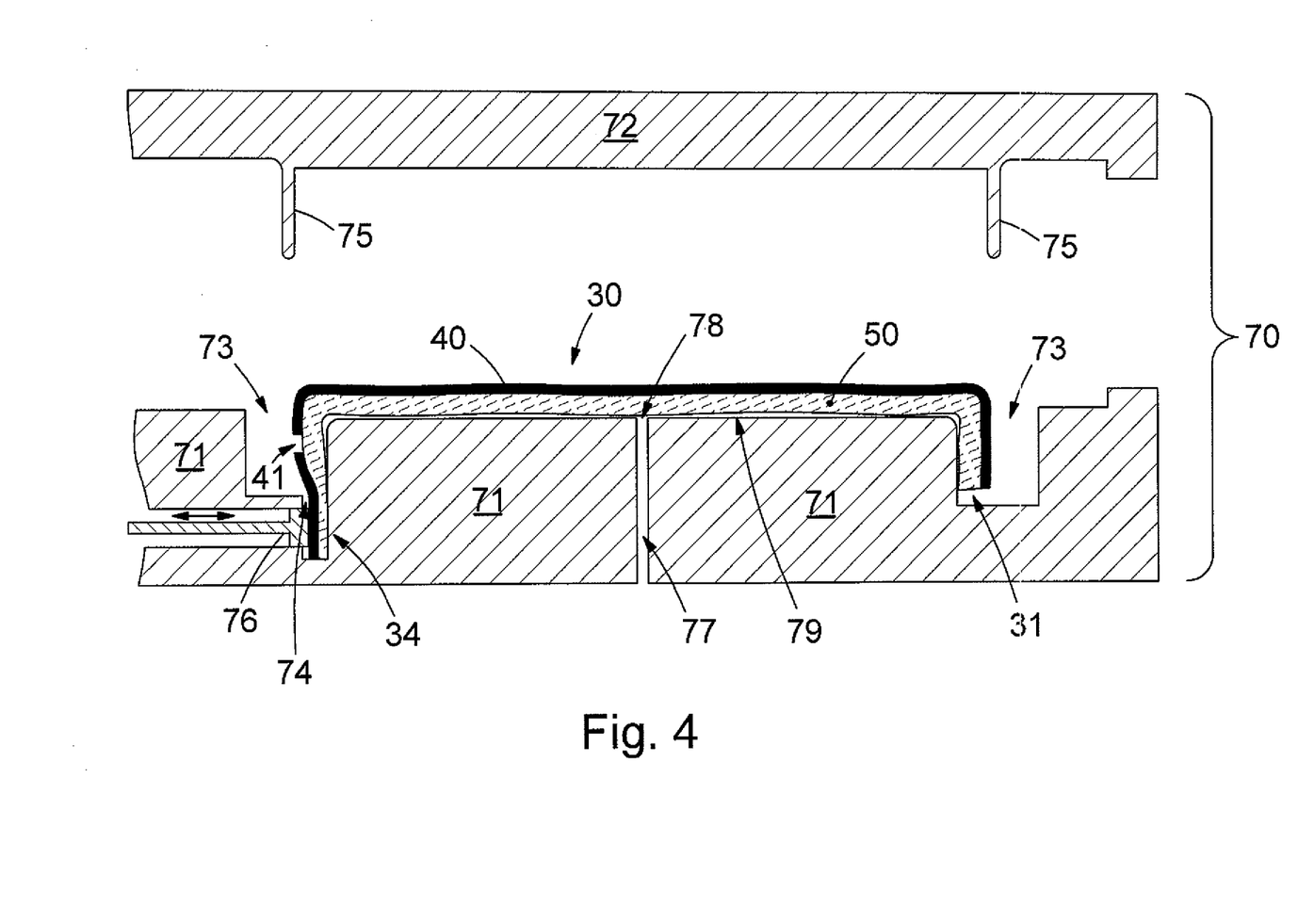
FIG. 4 shows a sectional representation of an opened injection mould with inserted decorative part.

In one embodiment, the carrier 20 features one or more grooves 22 that serve for accommodating and laminating an edge region 32 of the decorative part 30 that is illustrated in FIG. 3. In the context of the present disclosure, the term "groove" refers to a recess in the carrier 20. The groove or grooves 22 may have any cross-sectional shape such as, for example, an approximately trapezoidal profile. However, it is preferred to use grooves with an essentially rectangular cross section, the long sides of which are aligned relative to a surface normal 24 of the carrier 20 by an angle of −40 to +40 degrees, particularly 0 degrees. According to FIGS. 4-7, a lower region of the groove 22 may have an irregular cross section that is created during the manufacture of the shaped article 10 by means of injection shaped article, wherein the final shape of the lower region of the groove 22 depends on how a plasticized material 21 distributes in an injection mould 70.

In one embodiment, the carrier 20 features a groove 22 that is closed similar to a ring as shown in FIG. 1 and surrounds an optional supporting surface 23 for the decorative part 30. The optional supporting surface 23 is recessed relative to the surface of the carrier 20 by a depth that approximately corresponds to the thickness of the decorative part 30. The supporting surface 23 preferably is non-positively connected to a surface 35 of the decorative part 30 that lies opposite of the visible layer 40, preferably bonded thereto in a thermoplastic fashion due to the manufacture of the carrier 20 by means of injection shaped article.

The groove 22 has a width and a depth that respectively correspond to approximately the thickness of the decorative part 30 (i.e., 4.5 to 27.0 mm) and approximately the width of the edge region 32 (i.e., 10 to 30 mm) of the decorative part 30. The edge region 32 is defined by an edge 31 and a center line 33 of a foldback region of the decorative part 30. The center line 33 is defined by the arrangement of the decorative part 30 on or in the carrier 20 and extends in the center of the foldback region, i.e., the curved region of the decorative part 30, as indicated by the dot-dash line 33' in FIG. 7.

At least one embodiment also includes decorative parts 30 with one or more lugs 34 arranged on the edge thereof as illustrated in FIGS. 4-7 and FIGS. 12-19. If the decorative part 30 is equipped with lugs 34, the carrier 20 also features leadthroughs or openings for the lugs 34 in addition to the groove(s) 22.

The decorative part 30 is realized in the form of a planar textile-like mat and comprises two or more layers that, according to FIGS. 4-11, are referred to as visible layer 40 and cushion layer 50 below. The visible layer 40 preferably consists of a knitted or woven fabric of natural or synthetic fibers or mixtures thereof. The visible layer 40 is, for example, a layer of carpet, velour, printed film, TPO-film, PVC-film leather or synthetic leather. In one embodiment, the cushion layer 50 is manufactured of an elastic material that is selected from the group comprising natural and synthetic elastomers, foamed polymers, nonwoven fabrics of natural or synthetic fibers or mixtures thereof, as well as knitted spacer fabrics of synthetic filaments.

In one embodiment, the decorative part 30 also comprises an insulating layer 60 that is arranged adjacent to the cushion layer 50 and opposite of the visible layer 40. The insulating layer 60 has the function of protecting the material of the cushion layer 50 from thermal damages by the hot injection shaped article compound. The insulating layer 60 is preferably manufactured of a nonwoven fabric of natural or synthetic fibers or mixtures thereof.

The visible layer 40, the cushion layer 50 and the optional insulating layer 60 may be connected to one another in a punctiform, linear or planar fashion by means of bonding, sewing or laminating.

The decorative part 30 is arranged on the carrier 20 in such a way that the cushion layer 50 and, if applicable, the optional insulating layer 60 face the carrier 20 and the visible layer 40 faces away from the carrier 20. The layers of the decorative part are arranged in the direction of the surface normal 24 of the carrier 20 in one of the two following sequences:
(i) cushion layer 50/visible layer 40; or
(ii) insulating layer 60/cushion layer 50/visible layer 40.

In addition to the visible layer 40, the cushion layer 50 and the optional insulating layer 60, the decorative part 30 may also comprise other functional layers that may be arranged between the visible layer 40 and the cushion layer 50 and/or between the cushion layer 50 and the insulating layer 60.

The precut sections of the visible layer 40, the cushion layer 50 and, if applicable, the insulating layer 60 preferably are congruent such that the edges of the visible layer 40, the cushion layer 50 and, if applicable, the insulating layer 60 extend flush and define the edge 31 of the decorative part 30. In alternative embodiments, the precut sections of the visible layer 40, the cushion layer 50 and, if applicable, the insulating layer 60 deviate from one another. The cushion layer 50 may, in particular, be larger than the visible layer 40, wherein the edge 31 is defined by the edge of the cushion layer 50 in this case.

In one embodiment, the visible layer 40 and the optional insulating layer 60 respectively have a thickness of about 0.5 to 6.0 mm, such as about 0.5 to 4.0 mm, for example about 1.0 to about 2.0 mm.

In the relaxed state without pressure load, the elastic cushion layer 50 has a thickness of about 4 to about 15 mm, such as about 4 to about 12 mm, for example about 4 to about 8 mm.

Accordingly, the decorative part 30 has a thickness of from about 4.5 to about 27.0 mm.

At least one embodiment also includes decorative parts 30 with one or more lugs 34 arranged on the edge thereof as illustrated in FIGS. 4-7 and FIGS. 12-19. In this context and in the following description, the term "edge" (reference symbol 31) refers to the circumferential boundary of the decorative part 30 without taking into account any existing lugs 34. In the region of a lug 34, the term "edge" (reference symbol 31) refers to an imaginary boundary line that respectively connects or extends the edge segments extending to both sides of the lug 34.

FIG. 3 shows a top view of a flatly outspread decorative part 30. The edge region 32 of the decorative part 30 is provided for the anchoring in the carrier 20, as well as for the lamination by the carrier 20. The edge region 32 depends on the respective design, i.e., the shape of the precut section of the decorative part 30 and the surface shape of the carrier 20, and is defined by the edge 31 and the center line 33 of the foldback region (see also FIG. 1 and FIG. 7). The edge region 32 is preferably realized in the form of a strip of constant width 32', wherein the width 32' is defined in a direction extending parallel to the surface of the decorative part 30 and perpendicular to the edge 31 of the decorative part 30. According to the embodiment, the edge regions 32 provided have a width 32' of about 10±2 to about 30±2 mm, such as about 10±2 to about 25±2 mm, for example about 10±2 to about 20±2 mm.

Due to the finite manufacturing tolerances of industrial production methods, particularly slight fluctuations in the positioning of the decorative part 30 on the carrier 20, the edge region 32 of a novel shaped article 10 or of the respective decorative part 30 slightly deviates from the design specifications. Accordingly, the above-specified range limits for the width 32' of the edge region 32 are respectively indicated with a tolerance of about ±2 mm.

Figure 7:
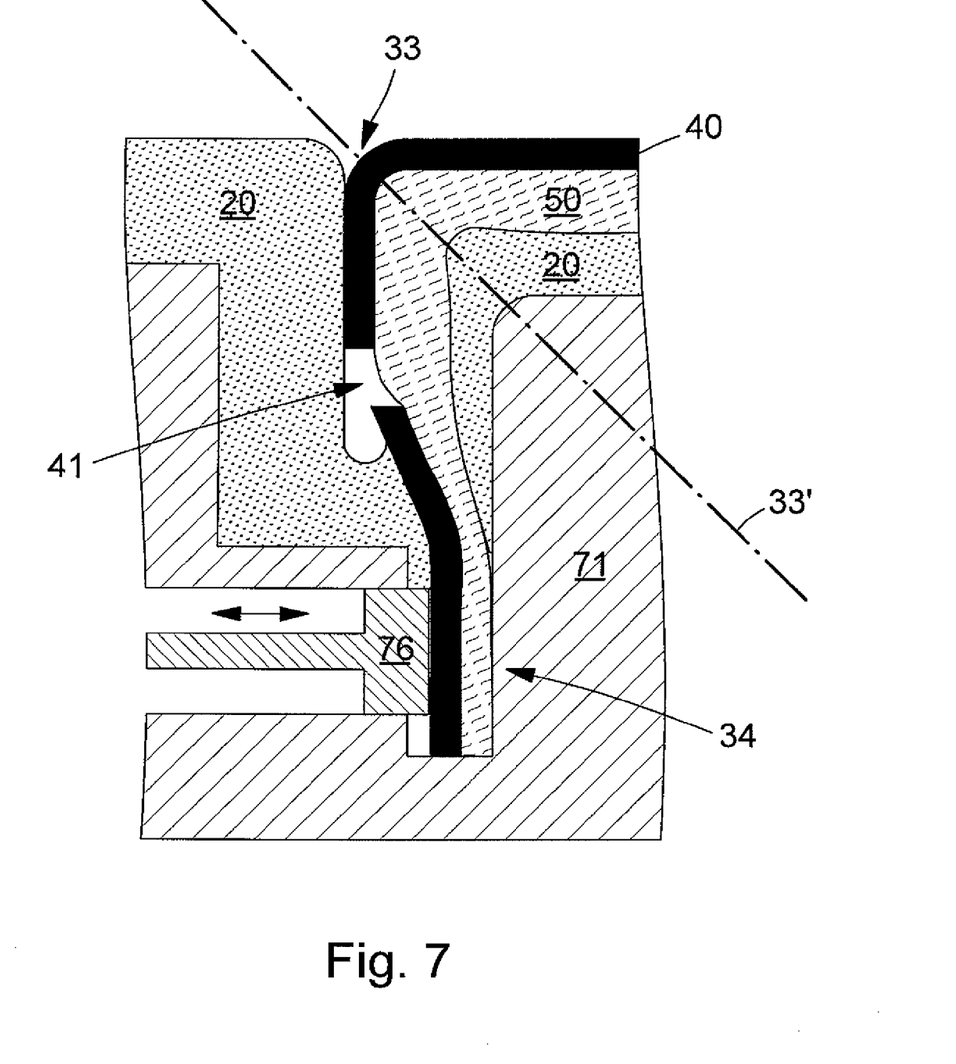
FIG. 7 shows a detail of FIG. 6.
Figure 8:
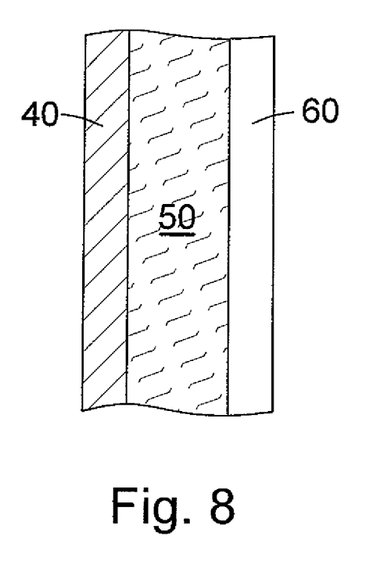
FIGS. 8 to 11 show sectional representations of three-layer decorative parts.
Figure 9:
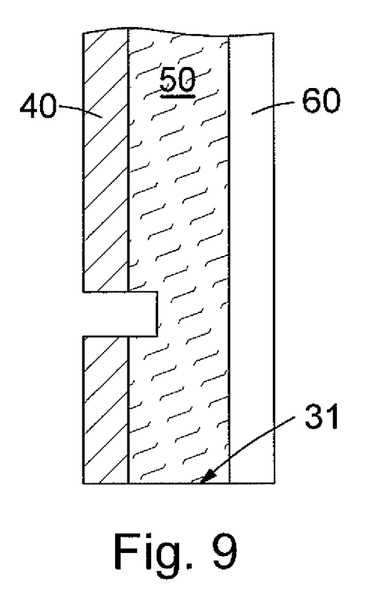
Figure 10:
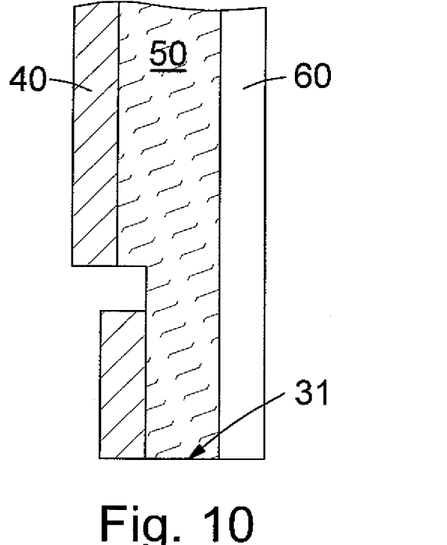

In order to measure the width of the edge region 32, the shaped article 10 with the decorative part 30 is cut in a plane that lies perpendicular to the edge 31 of the decorative part 30 (see FIG. 7). Based on such cuts, the contour and the width 32' of the edge region 32 can be precisely determined with known methods such as computer-assisted image analysis. A person skilled in the art is familiar with other methods for precisely measuring three-dimensional contours, in particular, by means of automated tactile contour measuring devices such as, for example, of the type CONTURA G2(R) by Zeiss. The edge region 32 to be measured needs to be exposed or accessible from outside in order to measure the edge region 32 with such a contour measuring device. For this purpose, the material of the carrier 20 that surrounds the edge region 32 to be measured is removed, for example, by means of a milling machine.

In one embodiment, the decorative part 30 is equipped with one or more lugs 34 on its edge as illustrated in FIGS. 12-19. The lugs 34 are considered to belong to the edge region 32 or to form part of the edge region 32, respectively. The at least one lug 34 serves for fixing the decorative part 30 in the injection mould 70. The lugs 34 preferably have a rectangular or different shape, e.g., a trapezoidal shape, and a potential maximum width of about 10 to about 80 mm, such as about 20 to about 60 mm, for example about 20 to about 40 mm, depending on the lug shape. In this context, the term "width" refers to the dimension of the lugs 34 in a direction extending parallel to the edge 31 of the decorative part 30. Measured in the direction extending perpendicular to the edge 31, the lugs 34 have a potential maximum length of about 10 to about 100 mm, such as about 20 to about 80 mm, for example about 30 to about 50 mm, depending on the lug shape.

The decorative part 30 features one or more recesses 41 that are arranged within the edge region 32 and, if applicable, within the optional lugs 34. The recesses 41 serve for largely inhibiting the transmission of tension forces acting parallel to the surface of the decorative part 30 within the only slightly stretchable visible layer 40 when the decorative part 30 is fixed in the injection mould 70. Accordingly, the recesses 41 have a depth that corresponds to at least about one-third of the thickness of the visible layer 40. The recesses 41 preferably extend through the entire visible layer 40 and, if applicable, into the cushion layer 50 situated adjacent to the visible layer 40 (see FIGS. 4-11). The recesses 41 have a depth of about 0.2 to about 10 mm, such as about 1.0 to about 6.0 mm, for example about 2.0 to about 4.0 mm.

The recesses 41 may have any shape and orientation, wherein the recesses 41 are realized, e.g., with a circular, elliptical or polygonal shape. The recesses 41 are preferably realized in the form of rectangles or slots as illustrated in the form of a top view in FIGS. 12-15 and FIGS. 16-19, respectively. The recesses 41 in the form of slots or rectangles are preferably arranged in the visible layer 40 such that the central longitudinal axis 42 of the slots or rectangles is aligned parallel to the edge 31 of the decorative part 30 as illustrated in FIG. 3, FIGS. 12-15 and FIGS. 16-19. According to the embodiment, the longitudinal axis 42 of the recesses 41 is arranged relative to the edge 31 or to the center line 33 of the foldback region by an angle of less than/equal to about ±40 degrees, such as less than/equal to about ±20 degrees, for example less than/equal to about ±10 degrees.

If the decorative part 30 features lugs 34, the recesses 41 are preferably arranged within and/or in front of the lugs as illustrated in FIGS. 12 to 19. In this context, the term "in front of the lugs 34" refers to a configuration, in which the recesses 41 are arranged between the edge 31 and the center line 33 of the foldback region and partially or entirely extend parallel to the edge 31 in or within a region that is defined by the width of the lugs 34. This arrangement ensures that any tension forces exerted upon the decorative part 30 when the lugs 34 are fixed or clamped in the injection mould 70 essentially do not act upon the visible layer 40.

FIG. 3 shows, in accordance with one embodiment, the decorative part 30 having a recess 41 that is closed similar to a ring.

The rectangular or slot-like recesses 41 have a width 43 of about 0.2 to about 5.0 mm, such as about 1.0 to 3.0 mm, for example about 2.0 to about 3.0 mm.

The rectangular or slot-like recesses 41 are arranged in the edge region 32 such that their central longitudinal axis 42 extends at a distance 44 of about 0 to about 15 mm, such as about 2 to about 12 mm, for example about 2 to about 8 mm, from the edge 31 of the decorative part 30.

In a direction extending parallel to the edge 31, the rectangular or slot-shaped recesses illustrated in FIGS. 12-19 have a length of about 2 to about 300 mm, such as about 2 to about 80 mm, for example about 2 to about 10 mm.

In embodiments, in which the decorative part 30 features one or more lugs 34, it is furthermore proposed to arrange the recesses 41 partially or entirely within the lugs 34 (see FIG. 12 and FIG. 16), wherein the central longitudinal axis 42 extends at a distance of about 0 to about 8 mm, such as about 2 to about 6 mm, for example about 3 to about 5 mm, from the edge 31 of the decorative part 30 or the imaginary boundary line 31, respectively.

Figure 11:
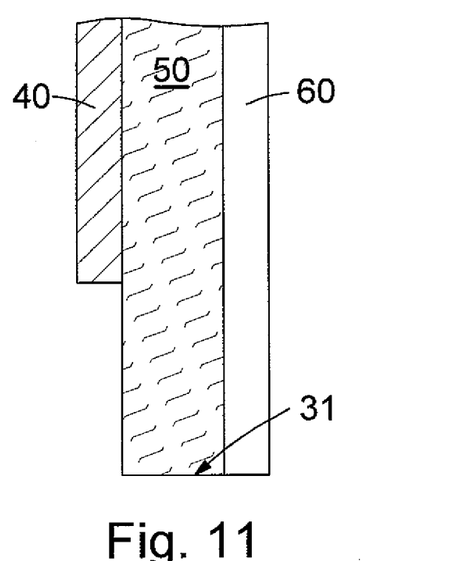
Figure 12:
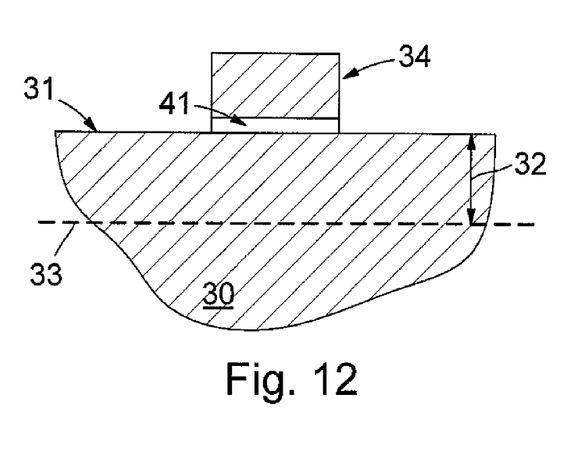
FIGS. 12 to 15 show top views of decorative parts with rectangular recesses.
Figure 13:
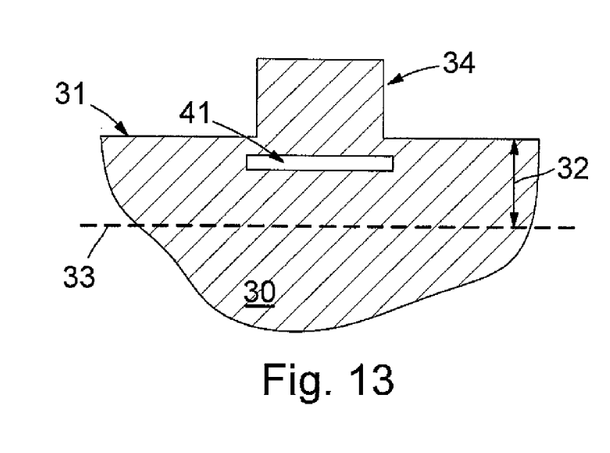
Figure 14:
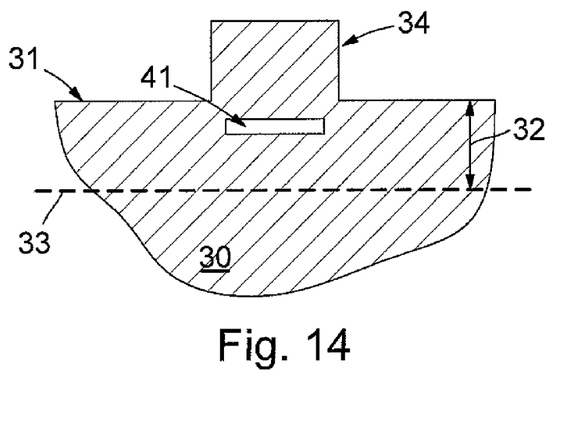
Figure 15:
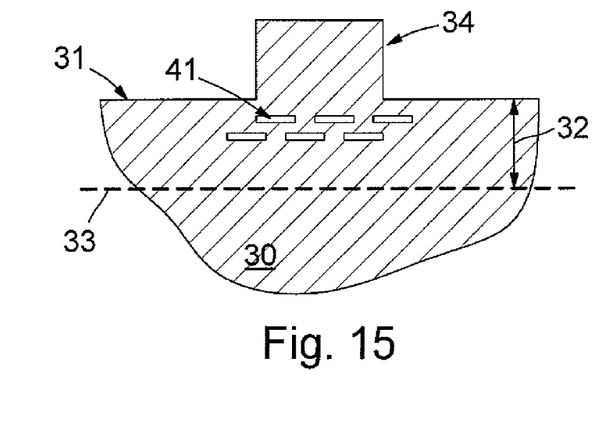
Figures 16, 18:
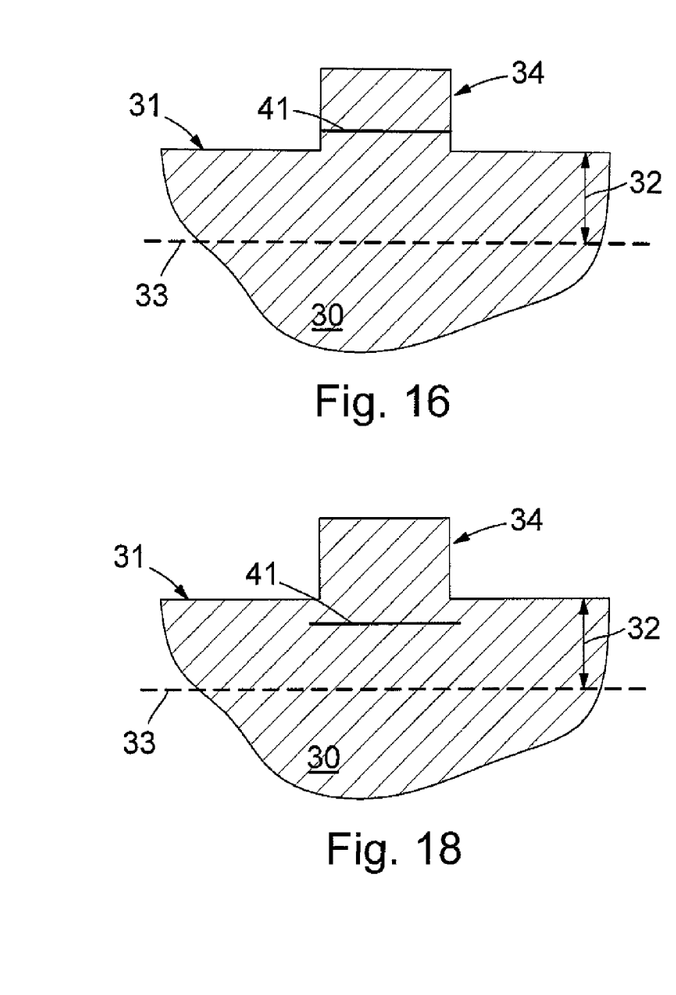
FIGS. 16 to 19 show top views of decorative parts with slot-like recesses.
Figures 17, 19:
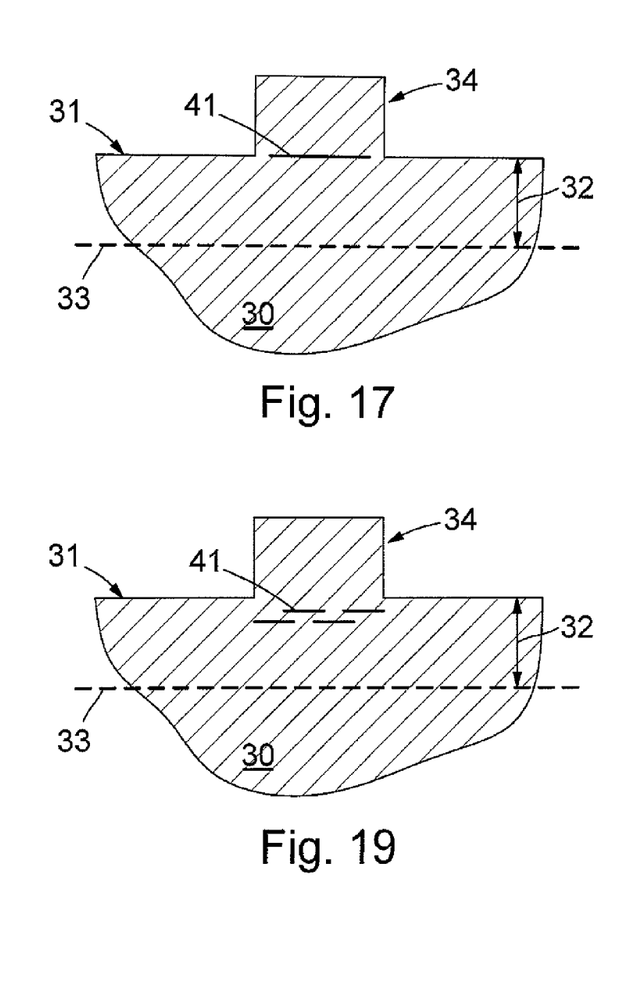

In an additional development that is illustrated in the form of a sectional representation in FIG. 11, the width of one or more recesses 41 extends up to the edge 31 of the decorative part 30, wherein an edge region of the cushion layer 50 that is not covered by the visible layer 40 and, if applicable, an edge of the optional insulating layer 60 form the edge 31 of the decorative part 30.

In order to manufacture a decorative part 30 for a novel shaped article 10, one or more recesses 41 are initially produced in the edge region 32 of the decorative part 30 by means of a mechanical, thermal or laser-optical cutting device. The cutting device makes it possible to precisely adjust the cutting depth relative to the surface of the visible layer 40 and, if applicable, to dynamically control or readjust said cutting depth during the cutting process. The cutting depth is chosen greater than/equal to one-third of the thickness of the visible layer 40. The cutting depth preferably corresponds to about 0.9-times to about 1.5-times the thickness of the visible layer 40. It is preferred that the decorative parts 30 and the recesses 41 are respectively cut into precut sections and produced in one step by means of an automated cutting device.

The further steps for manufacturing the shaped article 10 are described in greater detail below with reference to FIGS. 4-7. A precut decorative part 30 provided with recesses 41 is arranged in a first mould part 71 of a two-part or multi-part injection mould 70 manually or by means of an automated handling system. The injection mould 70 may include a back-injection mould that features one or more injection channels 77 with outlet openings 78 that are arranged within a supporting surface 79 intended for the decorative part 30 such that the decorative part is essentially back-injected centrally.

The first mould part 71 furthermore comprises one or more recesses 73 that serve for accommodating the edge region 32 of the decorative part 30. The mould part 71 preferably features a recess 73 that encloses the supporting surface 79 similar to a ring. The recess 73 preferably has a rectangular cross section with a width that approximately amounts to about 1.5-times to about 5-times the thickness of the decorative part 30. The recess 73 particularly has a width of about 6 to about 40 mm. In addition to its function as a receptacle for the edge region 32, the recess 73 serves for forming part of the carrier 20 to be produced by means of injection shaped article.

When processing decorative parts 30 that comprise lugs 34, the first mould part 71 is equipped with recesses 73 that are shaped to match the lugs 34.

The injection mould 70 comprises a second mould part 72 that is respectively realized in the form of a counterpart to or cover plate for the first mould part 71 and preferably equipped with one or more ribs 75 that engage into the recesses 31. The ribs 75 primarily serve for forming the groove 22 in the carrier 20. The ribs 75 preferably are also realized such that they serve for fixing the decorative part 30 in the injection mould 70. In the embodiment shown in FIG. 5, the ribs 75 are realized such that their inner lateral surfaces slightly press the edge region 32 of the decorative part 30 against the inner lateral surface of the recess 73 when the injection mould 70 is closed, i.e., when the second mould part 72 is attached onto the first mould part 71, and, if applicable, slightly compress the cushion layer 50 during this process, particularly by less than about 10% of its relaxed thickness.

Alternatively or additionally to the ribs 75, the injection mould 70 is equipped with a holding device 76 in order to fix the decorative part 30. The holding device 76 is realized, for example, in the form of a pressure piston or clamping piston that is displaceably guided in a leadthrough and seals this leadthrough relative to the plasticized material 21. The holding device 76 is displaceably arranged in the first mould part 71 such that it is directed at the edge region 32, if applicable, at a lug 34 of the decorative part 30.

Figure 5:
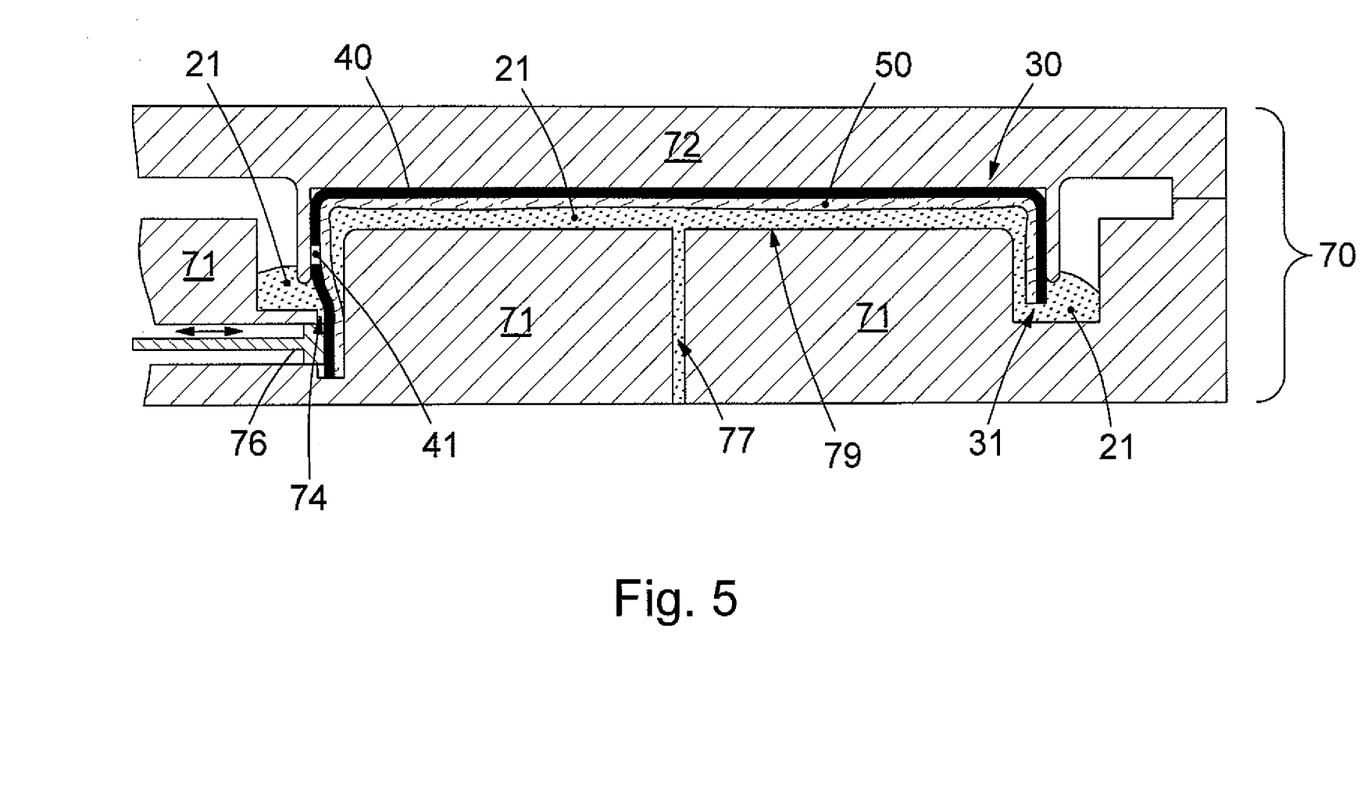
FIG. 5 shows a closed injection mould that is partially filled with plasticized material.
Figure 6:
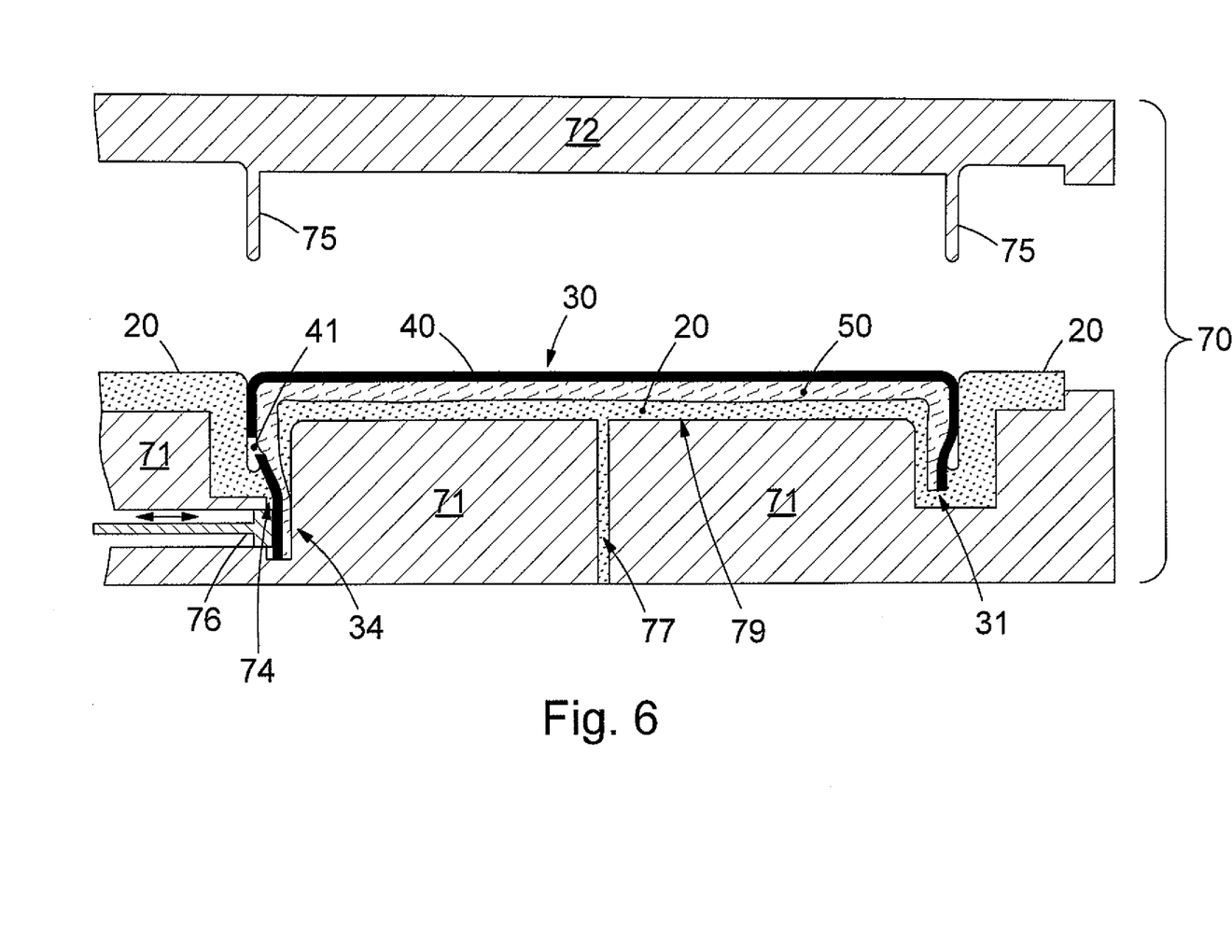
FIG. 6 shows an opened injection mould with a finished shaped article.

In the embodiment shown in FIG. 5, plasticized material 21 for the carrier 20 is injected into the injection mould 70 through the injection channel 77. The plasticized material 21 is injected into the injection mould 70 with a pressure of a few ten to a few hundred bar and fills out the remaining free internal volume of the injection mould 70. During this process, the elastic cushion layer 50 of the decorative part 30 is compressed. A layer of plasticized material 21 forms in the region of the supporting surface 79 and preferably is adhesively connected in a planar fashion to a surface 35 of the decorative part 30 that lies opposite of the visible layer 40, particularly to the cushion layer 50 or, if applicable, the insulating layer 60. The supporting surface 23 of the carrier 20 described above with reference to FIG. 1 is formed when the molten material 21 cools. The plasticized material 21 flows around the ribs 75 and the edge 31 of the decorative part 30, as well as, if applicable, the lugs 34. The decorative part 30 is non-positively connected to the carrier 20 by enclosing the edge region 31 in the subsequently solidified material 21.

After the solidification of the material 21, the injection mould 70 is opened, wherein the previously compressed cushion layer 50 respectively relaxes or expands such that the edge region 32 of the decorative part 30 fills out the gap between the visible layer 40 and the outer lateral surface of the groove 22 that was previously occupied by the ribs 75. The cushion layer 50 likewise relaxes in the region of the supporting surface 23 such that the surface of the visible layer 40 respectively is arranged flush with the surrounding surface of the carrier 20 or slightly protrudes therefrom depending on the design specifications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A shaped article comprising:
a carrier comprising a main carrier portion that is substantially planar and a bent carrier portion that is connected to and extends angular from the main carrier portion to define a groove; and
a flexible decorative part of planar design comprising a main decorative part portion that is disposed over the main carrier portion and an edge region that comprises a free end defining an edge and that extends from the main decorative part portion over the bent carrier portion into the groove, wherein the flexible decorative part comprises a visible layer and a cushion layer that is disposed between the carrier and the visible layer, wherein the flexible decorative part features has one or more recesses that are arranged in the edge region extending completely through the visible layer and extending longitudinally in the groove inboard from the edge, and wherein the cushion layer extends along the edge region including between the edge and the one or more recesses and covers the one of more recesses.

2. The shaped article according to claim 1, wherein the flexible decorative part comprises an insulating layer that lies adjacent to the cushion layer and faces the carrier, and wherein the insulating layer comprises a nonwoven material of natural or synthetic fibers or mixtures thereof.

3. The shaped article according to claim 1, wherein the edge region of the flexible decorative part is partially or entirely connected and/or a surface of the flexible decorative part that faces away from the visible layer is partially or entirely connected to the carrier in a non-positive fashion.

4. The shaped article according to claim 3, wherein the visible layer comprises a single-layer or multi-layer textile material including a knitted fabric or woven fabric of natural or synthetic fibers or a mixture thereof.

5. The shaped article according to claim 4, wherein the cushion layer comprises an elastic material including a polymer foam or a nonwoven fabric of natural or synthetic fibers or a mixture thereof.

6. The shaped article according to claim 5, wherein the carrier comprises a material that comprises a polymer matrix including polypropylene and additives that comprise color pigments, softeners, fillers, or mixtures thereof.

7. The shaped article according to claim 6, wherein the one or more recesses are independently configured as a slot or a rectangular cutout having a longitudinal axis aligned essentially parallel to the edge.

8. The shaped article according to claim 7, wherein the one or more recesses are each closed defining a ring.

9. The shaped article according to claim 8, wherein the edge region of the decorative part comprises one or more lugs that protrude from the edge, and wherein the one or more recesses are arranged within and/or in front of the lugs.

10. The shaped article according to claim 9, wherein the edge region has a width of about 10 to about 30 mm, the one or more recesses each have a width of about 0.2 to about 5.0 mm, and a central longitudinal axis of each of the one or more recesses extends at a distance of about 0 to about 20 mm from the edge of the flexible decorative part.

* * * * *